(12) United States Patent
Tien et al.

(10) Patent No.: US 8,602,622 B2
(45) Date of Patent: Dec. 10, 2013

(54) BACKLIGHT MODULE

(75) Inventors: Chung-Hao Tien, Hsinchu (TW);
Chien-Hsiang Hung, Hsinchu (TW);
Ming-Chin Chien, Hsinchu (TW);
Chih-Hong Lin, Hsinchu (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 90 days.

(21) Appl. No.: 13/114,059

(22) Filed: May 24, 2011

(65) Prior Publication Data

US 2011/0299297 A1    Dec. 8, 2011

(30) Foreign Application Priority Data

Jun. 7, 2010   (TW) ................................ 99118449 A

(51) Int. Cl.
*G02B 5/00*    (2006.01)
(52) U.S. Cl.
USPC .............................. 362/558; 362/27; 362/556
(58) Field of Classification Search
USPC ............ 362/26, 27, 551, 555, 556, 558, 560, 362/582, 609, 610, 613, 619, 628
See application file for complete search history.

(56) References Cited

U.S. PATENT DOCUMENTS

| | | | |
|---|---|---|---|
| 5,461,548 A | 10/1995 | Esslinger | |
| 5,568,964 A | 10/1996 | Parker | |
| 6,621,973 B1 * | 9/2003 | Hoffman | ......................... 362/26 |
| 6,655,825 B2 | 12/2003 | Muthu | |
| 6,714,185 B2 | 3/2004 | Kim | |
| 6,786,626 B2 * | 9/2004 | Wu et al. | ......................... 362/27 |
| 2005/0276064 A1 * | 12/2005 | Wu et al. | ....................... 362/555 |
| 2007/0018185 A1 * | 1/2007 | Hung | ............................ 362/555 |
| 2008/0037943 A1 * | 2/2008 | Lee et al. | ........................ 362/26 |

FOREIGN PATENT DOCUMENTS

TW             534970           6/2003

* cited by examiner

*Primary Examiner* — Y My Quach Lee
(74) *Attorney, Agent, or Firm* — Winston Hsu; Scott Margo

(57) ABSTRACT

A backlight module may include an optical substrate, at least one light guide pipe, and at least one first light source. At least one accommodation trench is disposed on the optical substrate for accommodating the light guide pipe. The first light source is disposed at one side of the light guide pipe and is arranged for emitting at least one first light into the light guide pipe. The first light is transferred in the light guide pipe and leaves the light guide pipe when being reflected by the optical substrate.

11 Claims, 13 Drawing Sheets

BACKLIGHT MODULE

BACKGROUND OF THE INVENTION

1. Field of the Invention

The present disclosure relates to a backlight module, and more particularly, to a backlight module comprising a light guide pipe for guiding lights together with an optical substrate for reflecting the lights.

2. Description of the Prior Art

Currently, photo-electric display technologies, following the semiconductor industries, have become a new integrated technology invested by many countries, and have been generally recognized as the most potential integrated technology industry by the academia and industry. Technology leading countries, such as U.S.A, Japan, Europe, have successively entered this technical field and are actively involved in research and design of this field. The applications of the photo-electric display technologies are very wide, such as image display applications, information storage applications, and optical communications applications. Therefore, the competitiveness of Taiwan can be improved by developments of the photo-electric display technologies.

In various kinds of backlight module technologies, the US patent with U.S. Pat. No. 6,655,825 has disclosed a technology of mixing colors and guiding lights by using coupling fibers and blending fibers. However, the lights transferred from the light source to the light guiding plate of the display have passed several times of couplings, and thus the utilization efficiency of the light source cannot be easily enhanced.

In the US patent with U.S. Pat. No. 6,714,185, a method for controlling the emergence angle of the lights by disposing different diffusion lines on a fiber having its head and tail connected to the same light source in order to form three-dimensional images is disclosed. However, by adopting the backlight module disclosed in this patent, the panel space utilization efficiency is too poor, and the coupling efficiency of the light source is much worse than the conventional technologies.

In the US patent with U.S. Pat. No. 5,461,548, a panel with a light pipe is disclosed, which utilizes a transparent PVC pipe to hitch the cores of several optical fibers into a beam of light pipe, and then the lights are transferred and emitted to the panel through the arrangements of the light pipes. However, in such a way, optical interference between different optical fibers may lower the efficiency. In addition, its manufacturing process is too difficult for mass production.

In the US patent with U.S. Pat. No. 5,568,964, a flexible optical fiber panel is disclosed, which couples the lights, emitted from at least one lighting layer packaged along the side edges and/or terminal edges, to the weaved optical fibers and uniformly emits the lights on the panel. However, in such a way, the manufacturing difficulty and cost will be increased. In addition, by adopting the superposition method to increase the amount of light emission, its efficiency will be sharply reduced.

In the TWN Patent with Patent No. 534970, a high-intensity fiber color backlight module is disclosed, which uses R, G, B colors as light sources to be coupled to specific fibers, and then the lights are emitted from the optical shutters of the fiber through geometric structures of the fibers. However, this method still cannot avoid the problem of light interfere.

As abovementioned, a light guide plate is needed in the backlight modules of conventional flat panel displays for uniformly transferring lights. However, when the size of the flat panel displays getting larger, the thickness of the light guide plate will be accordingly increased, which may results in facing the challenges of the volume of large-scale backlight modules being too large and complicated manufacturing processes. In addition, the fiber backlight module has a high cost, a large volume, and high energy loss. Hence, how to provide a backlight module with a low cost, a simple manufacturing process, and a high luminous efficiency has become an important topic in this field.

SUMMARY OF THE INVENTION

It is therefore one of the objectives of the present disclosure to provide a backlight module to solve the above-mentioned problems caused by the volume of large-scale backlight modules being too large and complicated manufacturing processes.

According to one aspect of the present disclosure, a backlight module is provided. The backlight module may include an optical substrate, at least one light guide pipe, and at least one first light source. The optical substrate may include at least one accommodation trench disposed thereon. The at least one light guide pipe may include a pillar, wherein the at least one light guide pipe is accommodated in the at least one accommodation trench. The at least one first light source is disposed at a first side of the at least one light guide pipe. The at least one first light source is arranged for emitting at least one first light into the at least one light guide pipe, and the at least one first light is transferred in the at least one light guide pipe and leaves the at least one light guide pipe when being reflected by the optical substrate.

According to an embodiment of the present disclosure, the backlight module may further include at least one first light source reflector disposed on the first side of the at least one light guide pipe and covering the at least one first light source, and is arranged for coupling the at least one first light emitted from the at least one first light source to the at least one light guide pipe.

According to an embodiment of the present disclosure, the backlight module may further include at least one second light source disposed at a second side of the at least one light guide pipe, wherein the at least one second light source is arranged for emitting at least one second light into the at least one light guide pipe, and the at least one second light is transferred in the at least one light guide pipe and leaves the at least one light guide pipe when being reflected by the optical substrate.

According to an embodiment of the present disclosure, the backlight module may further include at least one second light source reflector disposed on the second side of the at least one light guide pipe and covering the at least one second light source, and is arranged for coupling the at least one second light emitted from the at least one second light source to the at least one light guide pipe.

According to an embodiment of the present disclosure, a cross section of each of the at least one light guide pipe is shaped into a circular, an ellipse, or a polygon, and a cross section of each of the at least one accommodation trench is shaped into a circular, an ellipse, or a polygon corresponding to the light guide pipe.

According to an embodiment of the present disclosure, a film is disposed on a surface of each of the at least one accommodation trench, and the film comprises a material of aluminum, silver, or mercury or a material having a reflectivity greater than 80%.

According to an embodiment of the present disclosure, each of the at least one light guide pipe has at least one micro-optics structure disposed thereon, and each of the at least one micro-optics structure comprises a V-shaped incision, a hemispherical incision, or a pyramidal incision.

According to an embodiment of the present disclosure, an inner wall of each of the at least one light guide pipe is not parallel to an outer wall of the light guide pipe.

According to an embodiment of the present disclosure, each of the at least one light guide pipe comprises an optical film having at least one micro-optics structure, a plurality of particles with optical coupling, or their combination disposed thereon, and each of the at least one micro-optics structure comprises a V-shaped incision, a hemispherical incision, or a pyramidal incision.

According to an embodiment of the present disclosure, each of the light guide pipe is made of a translucent material, and the translucent material comprises a Poly methyl meth acrylate (PMMA), a quartz, a glass, a Polyvinylchloride (PVC), or a Polycarbonate (PC).

As mentioned above, the backlight module disclosure in the present disclosure possesses one or more of the following advantages:

(1). The light guide pipe(s) of the backlight module is capable of generating light-guiding effects by utilizing different arrangements of the light guide pipe(s), different geometric configurations, or different micro-optics structures, such that the large-scale backlight module(s) can be thinned in order to improve its luminous efficiency.

(2). The light guide pipe of the backlight module can be used as the light guiding element, such that complexity and cost of manufacturing processes for manufacturing the backlight can be reduced in order to further simplify the architecture of the optical system.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
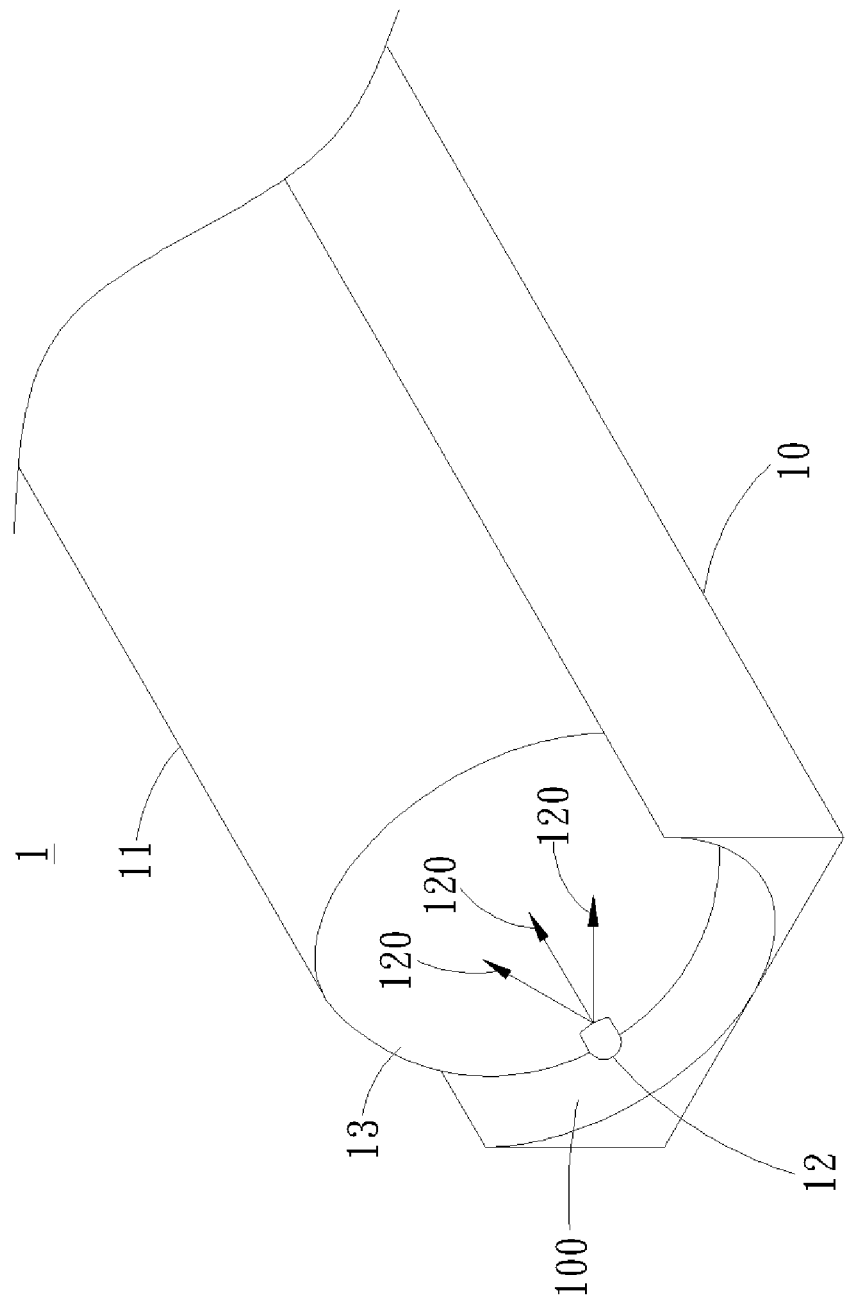
FIG. 1 is a partial diagram showing a light guide pipe and an optical substrate according to the present disclosure.

Please refer to FIG. 1. FIG. 1 is a partial diagram showing a light guide pipe and an optical substrate according to the present disclosure. As shown in FIG. 1, a backlight module 1 may include, but is not limited to, an optical substrate 10, at least one light guide pipe 11, and at least one first light source 12. The optical substrate 10 may include at least one accommodation trench 100 disposed thereon, wherein the at least one light guide pipe 11 is accommodated and fixed in the at least one accommodation trench 100. Please note that: the light guide pipe 11 can be made of a translucent material, and the translucent material may include a Poly methyl meth acrylate (PMMA), a quartz, a glass, a Polyvinylchloride (PVC), or a Polycarbonate (PC), but the present disclosure is not limited to this only. Furthermore, the first light source 12 is disposed at a first side of the light guide pipe 11, and is arranged for emitting at least one first light 120 into the light guide pipe 11. Be notes that the at least one first light 129 is transferred in the light guide pipe 11 and leaves the light guide pipe 11 when being reflected by the optical substrate 10. Additionally, in this embodiment, the backlight module 1 may further include at least one first light source reflector 13 disposed on the first side of the light guide pipe 11, wherein the first light source reflector 13 covers the first light source 12 and is arranged for coupling the at least one first light 120 emitted from the first light source 12 to the light guide pipe 11. Those skilled in the art should readily know that various types of devices capable of coupling the at least one first light 120 emitted from the first light source 12 to the light guide pipe 11 can be used for replacing the first light source reflector 13 without departing from the spirit of the present disclosure, which also belongs to the scope of the present disclosure.

Figure 2:
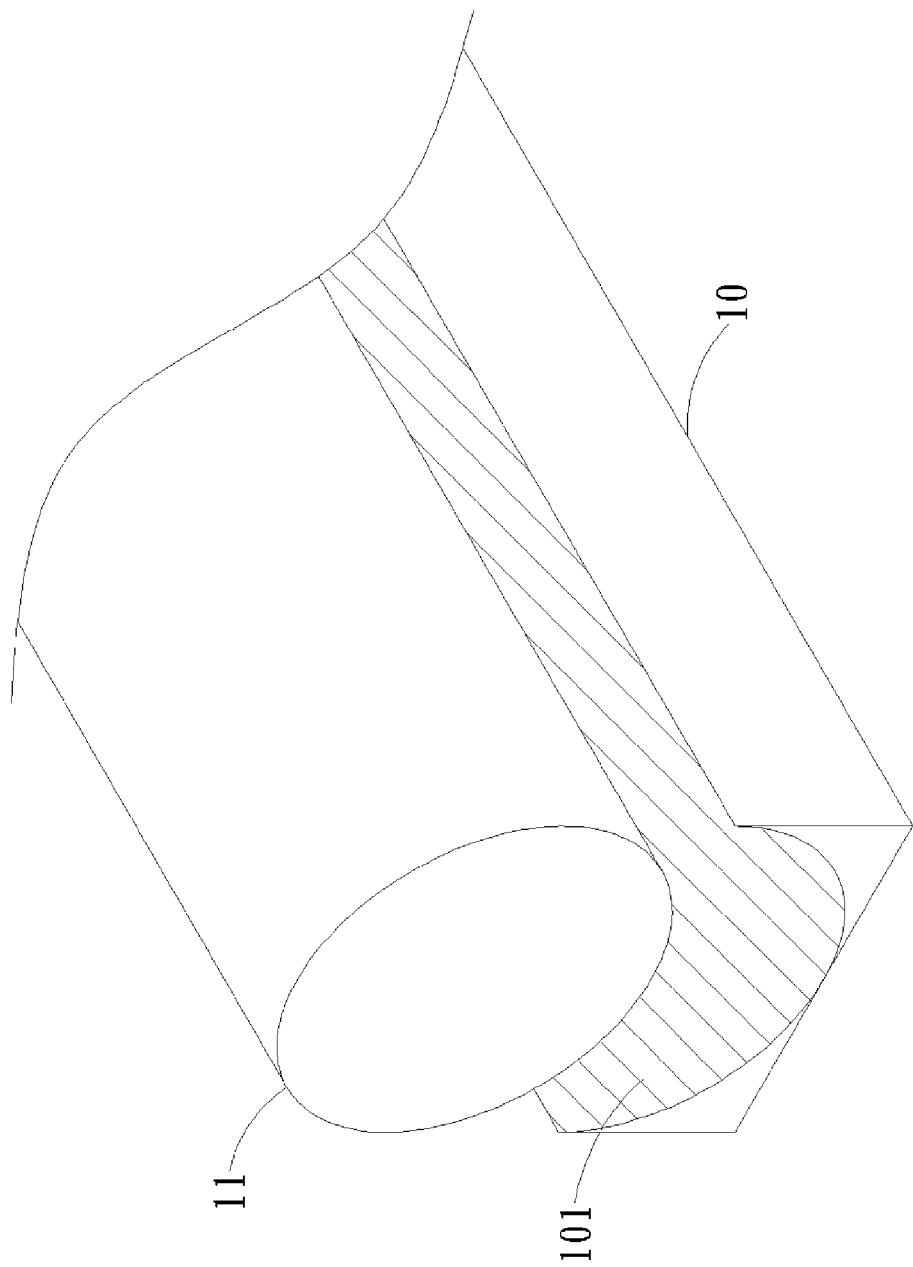
FIG. 2 is a diagram showing a light guide pipe and an optical substrate according to a first embodiment of the present disclosure.
Figure 3:
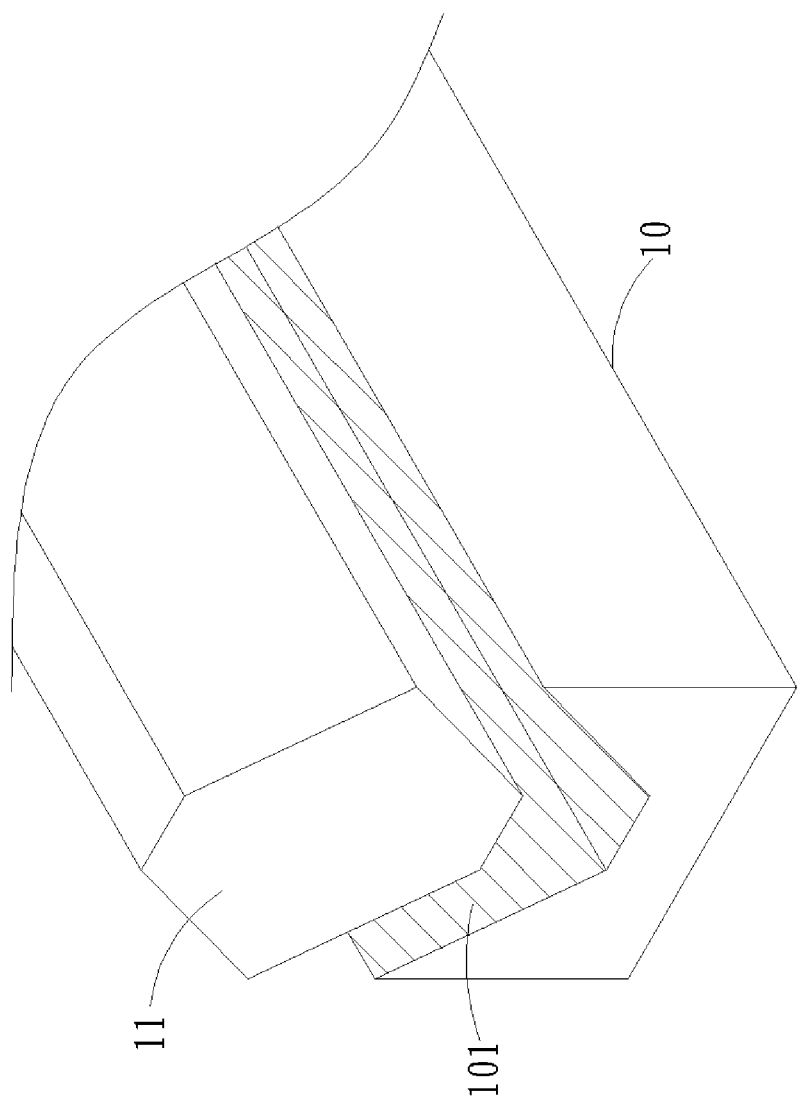
FIG. 3 is a diagram showing a light guide pipe and an optical substrate according to a second embodiment of the present disclosure.
Figure 4:
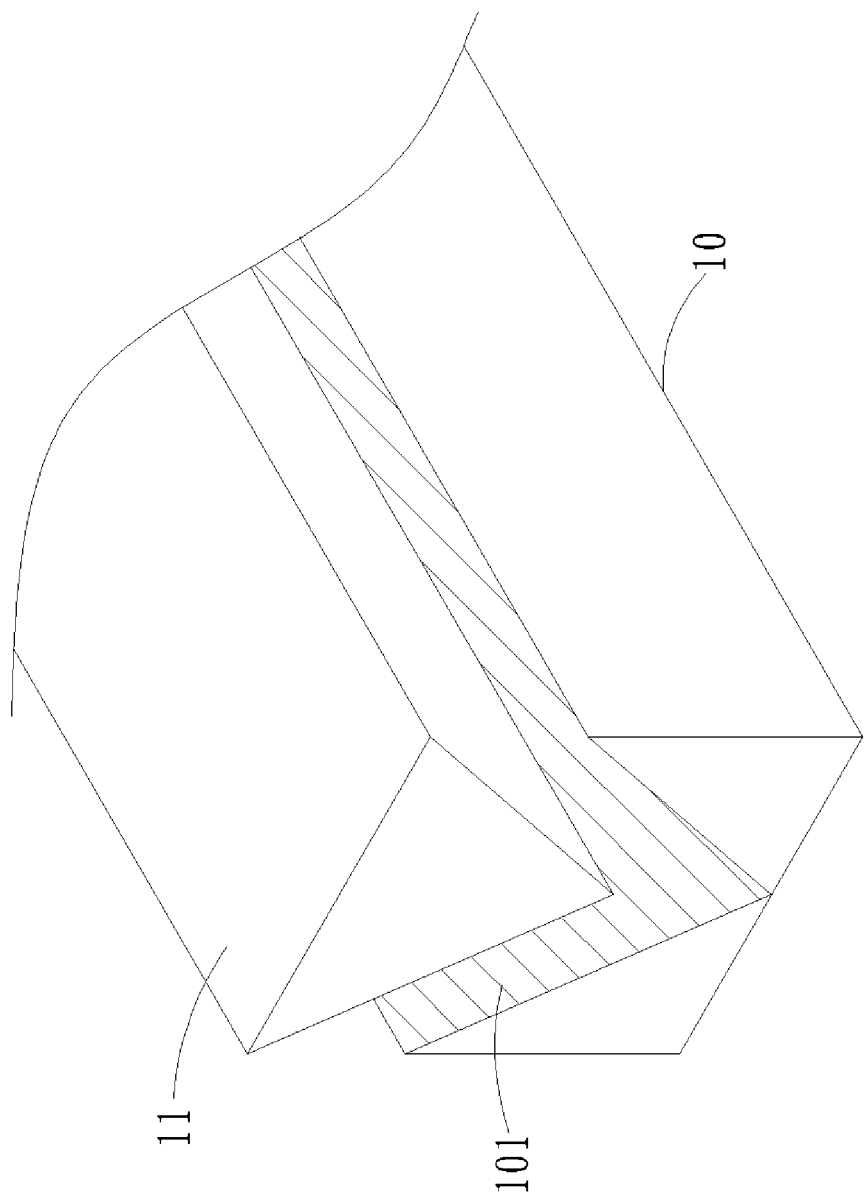
FIG. 4 is a diagram showing a light guide pipe and an optical substrate according to a third embodiment of the present disclosure.

Please refer to FIG. 2, FIG. 3, together with FIG. 4. FIG. 2, FIG. 3, and FIG. 4 are respectively a diagram showing a light guide pipe and an optical substrate according to a first embodiment, a second embodiment, and a third embodiment of the present disclosure. As shown, a cross section of the columnar light guide pipe 11 of the present disclosure can be shaped into a circular (as is shown in FIG. 2), an ellipse (not shown), or a polygon (such as a hexagon shown in FIG. 3 and a triangle shown in FIG. 4) or any irregular shape. The accommodation trench 100 is arranged for accommodating the light guide pipe 11, such that a cross section of the accommodation trench 100 should be corresponding to the cross section of the light guide pipe 11, and is respectively shaped into a circular (as is shown in FIG. 2), an ellipse (not shown), or a polygon (such as a hexagon shown in FIG. 3 and a triangle shown in FIG. 4). Please note that: the architecture of the light guide pipe 11 and the accommodation trench 100 of the optical substrate 10 is designed depending on different backlight requirements. In addition, those skilled in the art should readily know that various modifications of the architecture arrangements on the surface of the optical substrate 10 may be made depending on backlight requirements, wherein the architecture arrangements may be implemented by symmetrical arrangements or asymmetric arrangements. In addition, a film 101 can be disposed on the surface of the accommodation trench 100 in order to improve the utilization efficiency of the light(s), and the film 101 may include a material of aluminum, silver, or mercury or a material having a reflectivity greater than 80%.

Figure 5:
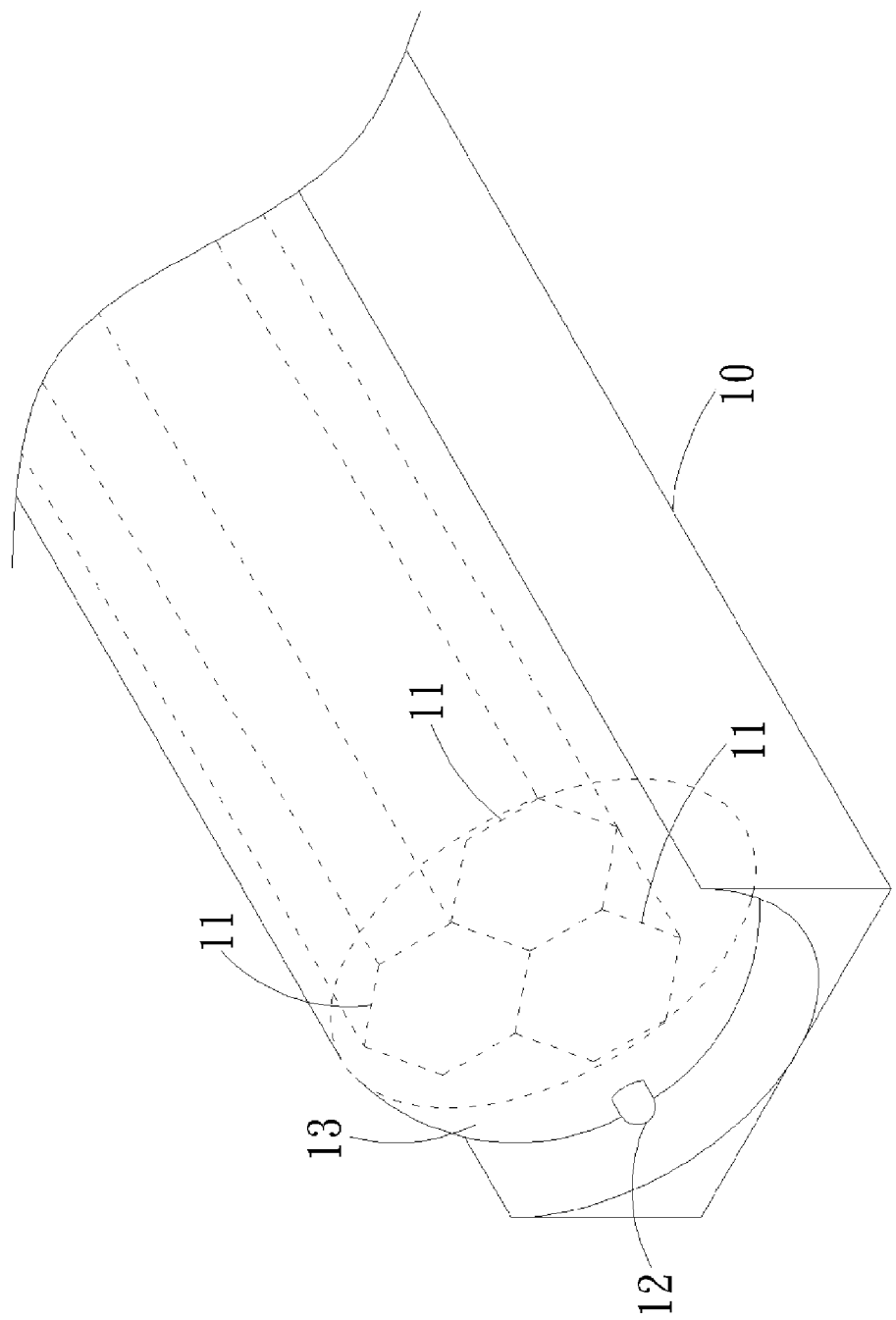
FIG. 5 is a diagram showing a combination of a plurality of light guide pipes according to a first embodiment of the present disclosure.
Figure 6:
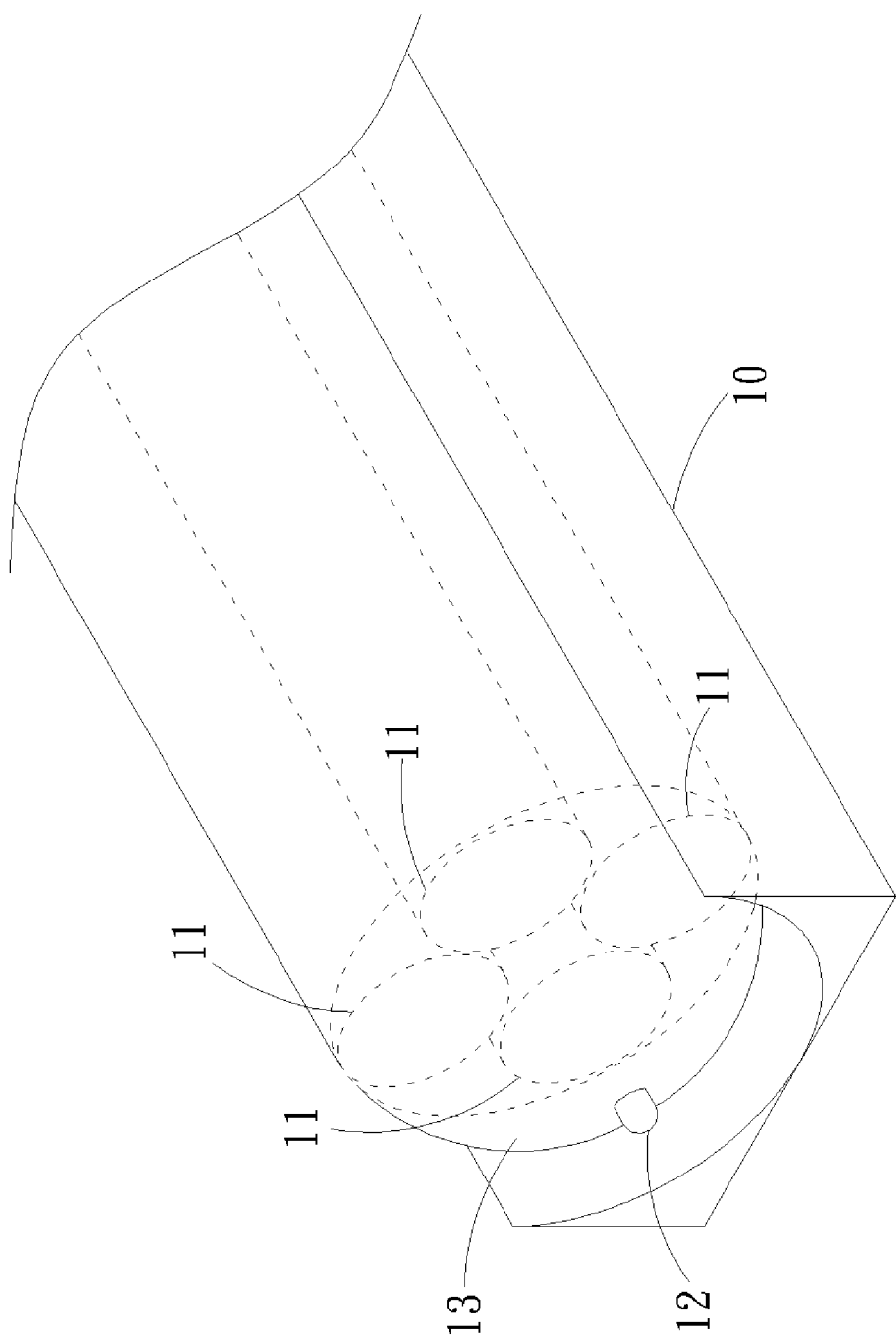
FIG. 6 is a diagram showing a combination of a plurality of light guide pipes according to a second embodiment of the present disclosure.

Please refer to FIG. 5 together with FIG. 6. FIG. 5 and FIG. 6 are respectively a diagram showing a combination of a plurality of light guide pipes according to a first embodiment and a second embodiment of the present disclosure. As shown, the difference between these two embodiments shown in FIG. 5-FIG. 6 and the embodiments shown in FIG. 1-FIG. 4 is that: each of these two embodiments shown in FIG. 5-FIG. 6 is implemented by adopting one first light source 12, one first light source reflector 13, as well as a plurality of corresponding light guide pipes 11. According to such arrangement, the first light source 12 with different sizes and different shapes can be collocated with the light guide pipe 11 with different sizes and different shapes (such as, the hexagonal light guide pipe 11 shown in FIG. 5 and the circular light guide pipe 11 shown in FIG. 6) in order to achieve the most efficient connectivity, thereby increasing the utilization of the light(s). Furthermore, those skilled in the art should readily know that the arrangements of the light guide pipe(s) 11 can be compacted or modified into other arrangements in order to achieve the optimum light coupling efficiency.

Figure 7:
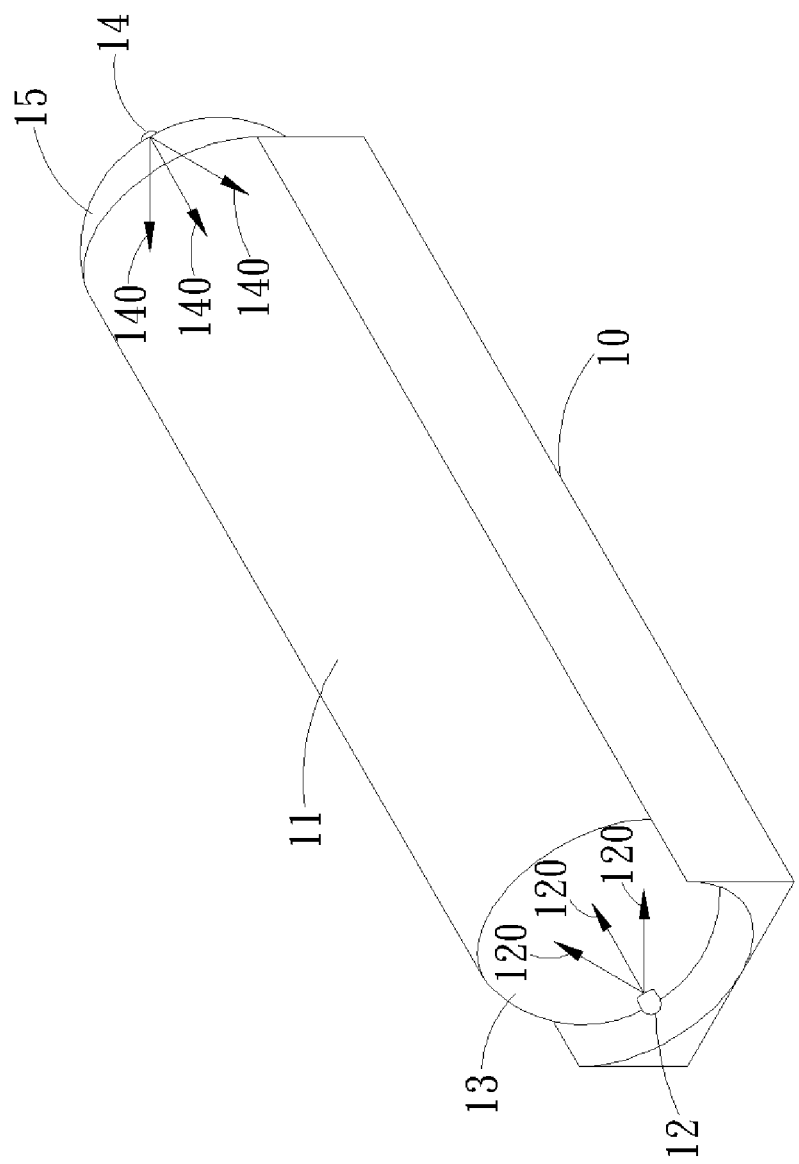
FIG. 7 is a diagram showing a combination of a plurality of light sources according to an embodiment of the present disclosure.

Please refer to FIG. 7. FIG. 7 is a diagram showing a combination of a plurality of light sources according to an embodiment of the present disclosure. As shown, in order to improve the uniformity of the light distribution of the backlight module, the backlight module 1 further includes, except for the first light source 12 disposed at the first side of the light guide pipe 11, at least one second light source 14 and at least one second light source reflector 15 disposed at a second side of the light guide pipe 11. The second light source 14 is arranged for emitting at least one second light 140 into the light guide pipe 11, wherein the at least one second light 140 is transferred in the light guide pipe 11 and leaves the light guide pipe 11 when being reflected by the optical substrate 10. The second light source reflector covers the at second light source 14, and is arranged for coupling the at least one second light 140 emitted from the second light source 14 to the light guide pipe 11.

Figure 8:
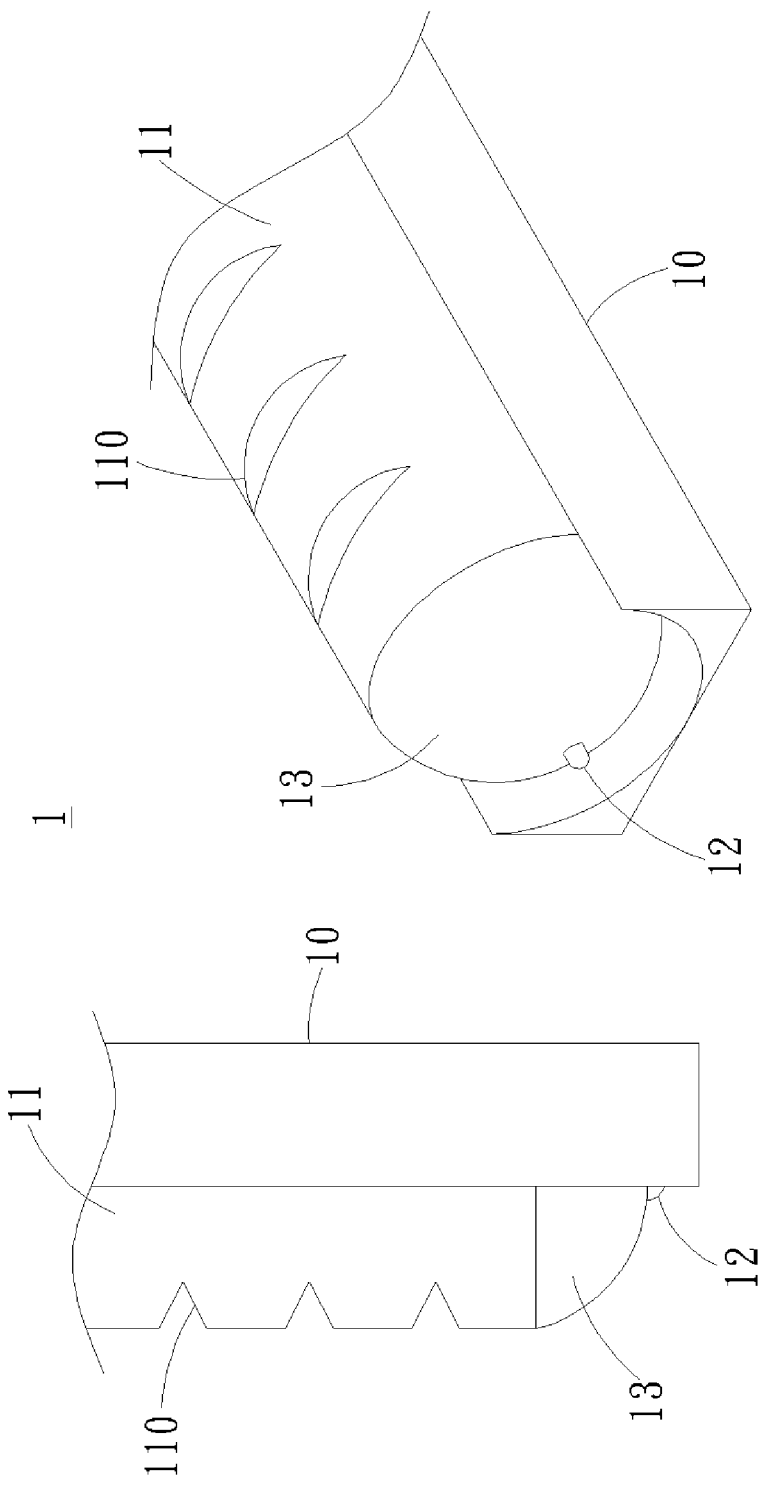
FIG. 8 is a diagram showing a micro-optics structure according to a first embodiment of the present disclosure.
Figure 9:
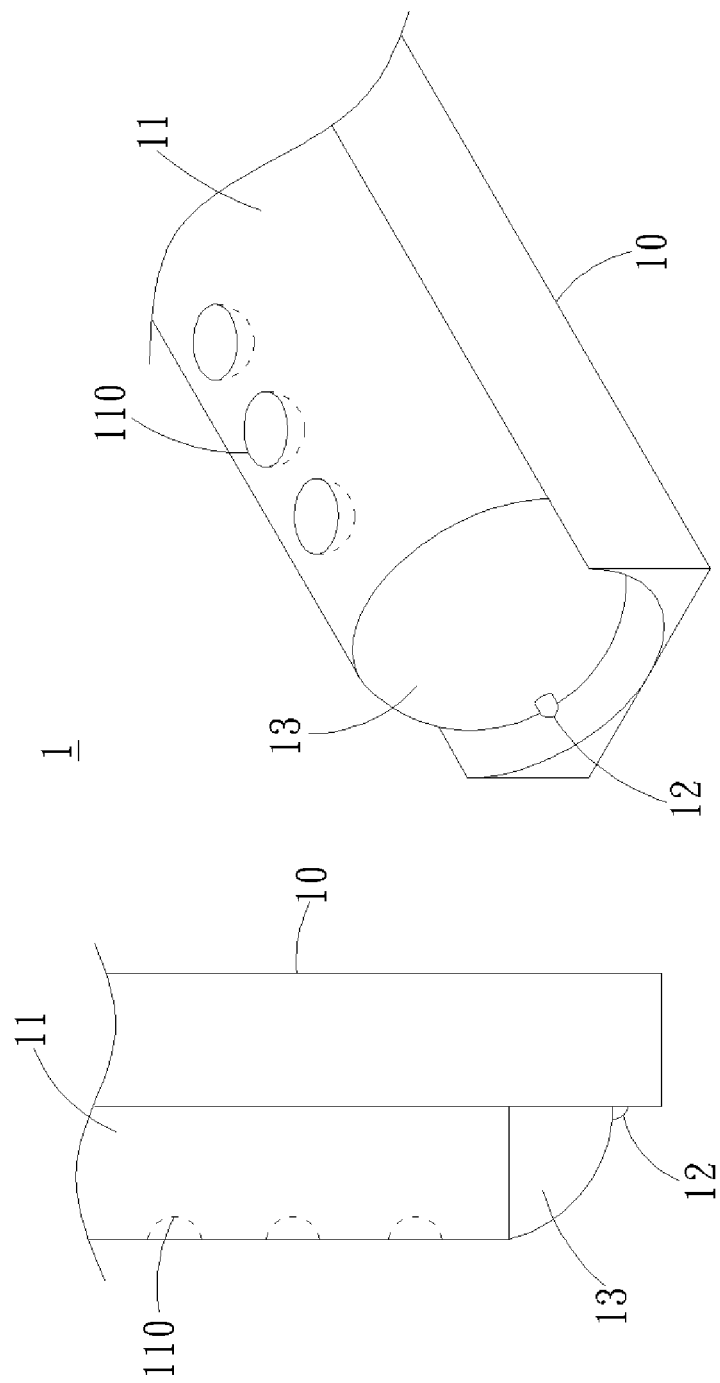
FIG. 9 is a diagram showing a micro-optics structure according to a second embodiment of the present disclosure.
Figure 10:
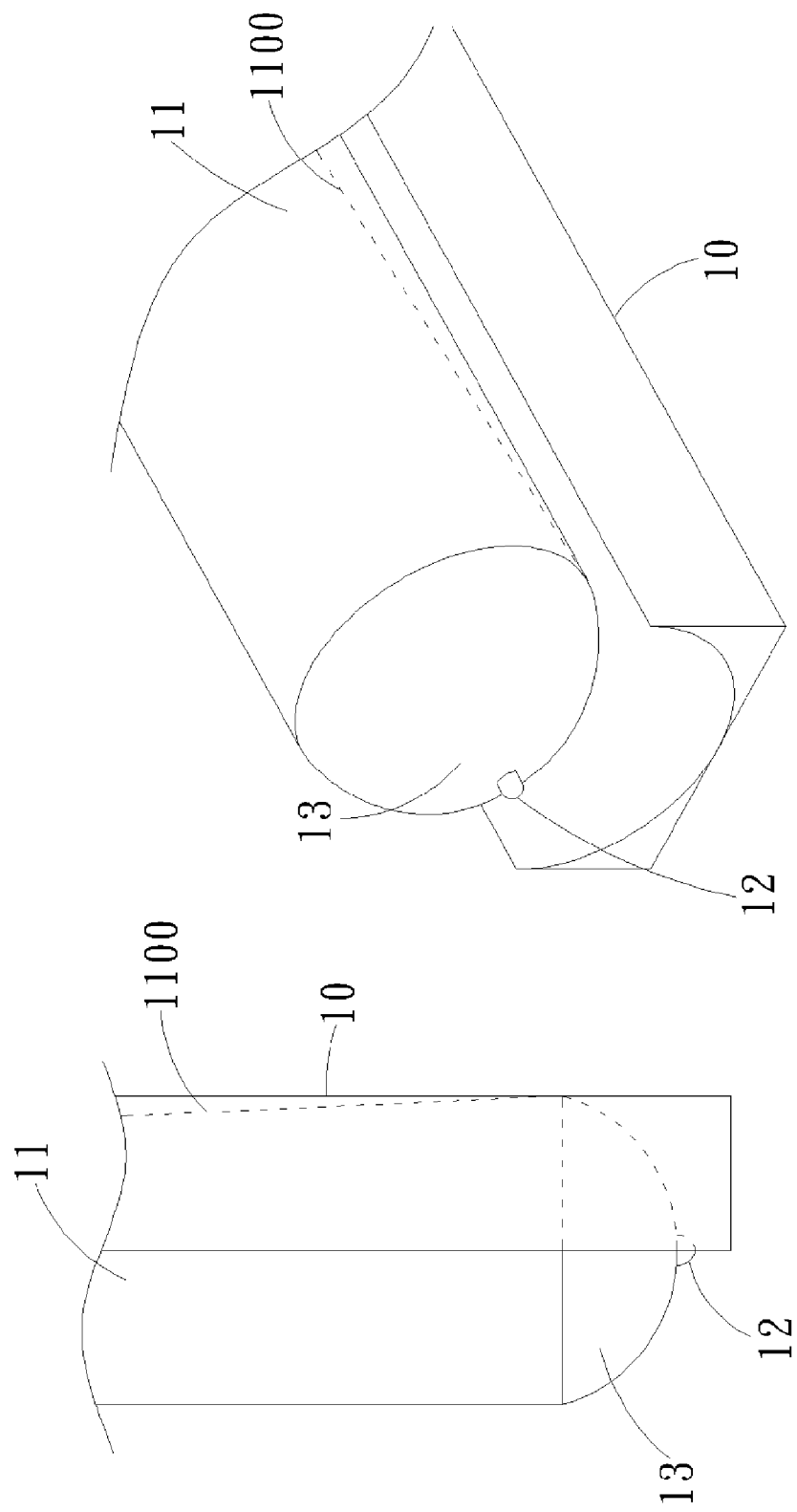
FIG. 10 is a diagram showing an inner wall of the light guide pipe according to an embodiment of the present disclosure.

Please refer to FIG. 8 and FIG. 9. FIG. 8 and FIG. 9 are respectively a diagram showing a micro-optics structure according to a first embodiment and a second embodiment of the present disclosure. As shown, the light guide pipe 11 may further include at least one micro-optics structure 110 disposed thereon, wherein each of the at least one micro-optics structure 110 can have a V-shaped incision, a hemispherical incision, or a pyramidal incision. After the light(s) is transferred in the light guide pipe 11, the light(s) can leave the light guide pipe 11 through the sidewall of the light guide pipe 11 and gets into a panel in front of the backlight module 1. For this reason, the micro-optics structure(s) 110 disposed in the sidewall can be used for increasing the efficiency of output of the light(s) from the light guide pipe 11. In addition, FIG. 10 is a diagram showing an inner wall of the light guide pipe according to an embodiment of the present disclosure. The inner wall 1100 of the light guide pipe 11 is not parallel to an outer wall of the light guide pipe 11, such that a light divergence section 111 with an oblique angle is presented. Such design of inner wall 1100 can also increase the efficiency of output of the light(s) from the light guide pipe 11. Among others, the density and the arrangement of the micro-optics structure 110 will affect the uniformity of the light(s) outputted from the sidewall of the light guide pipe 11. For this reason, the arrangement of the micro-optics structure 110 can be implemented by a symmetrical arrangement or an asymmetric arrangement with a single shape, or can be implemented by a symmetrical arrangement or an asymmetric arrangement with a variety of shapes.

Figure 11:
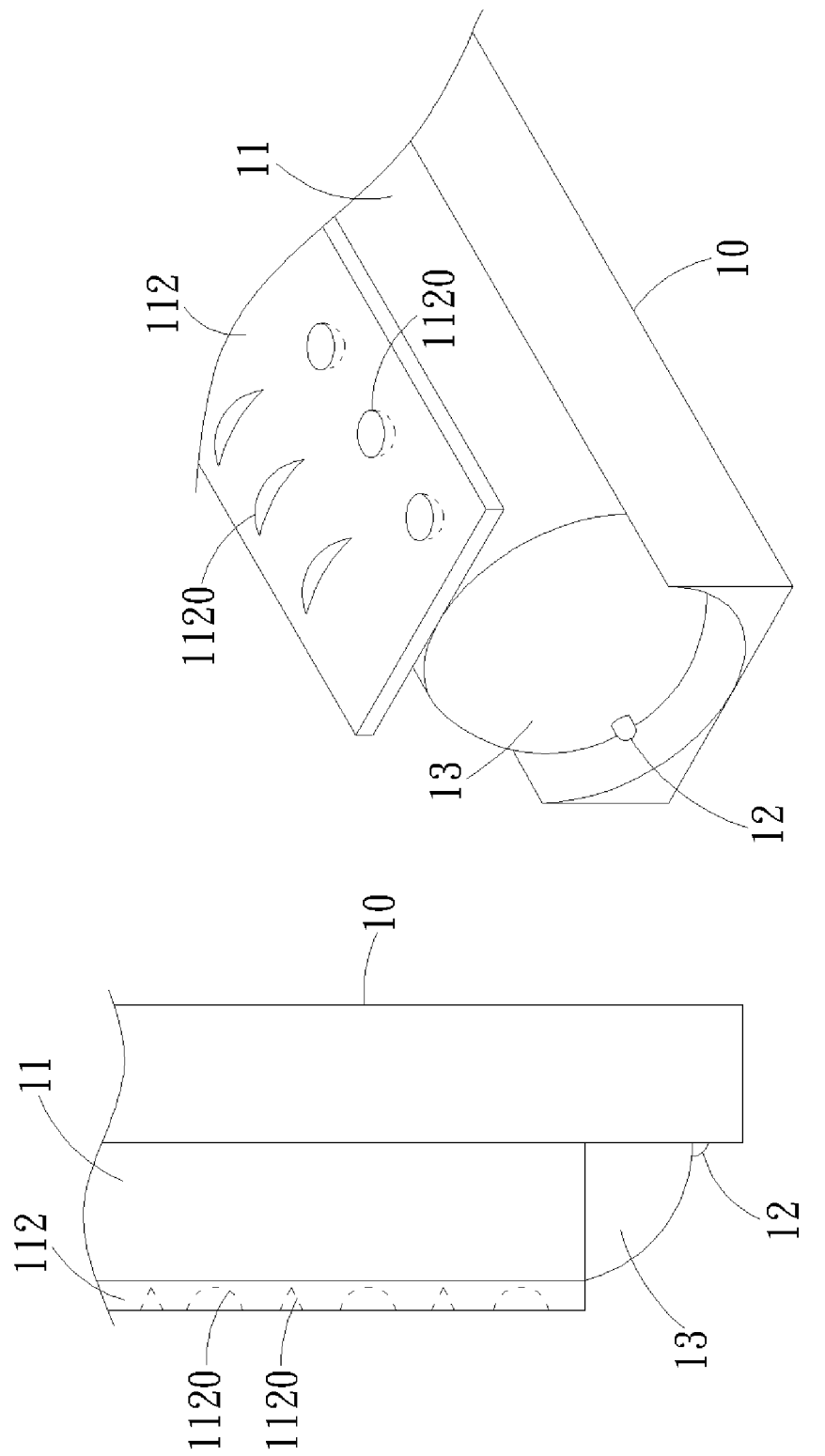
FIG. 11 is a diagram showing an optical film according to an embodiment of the present disclosure.
Figure 12:
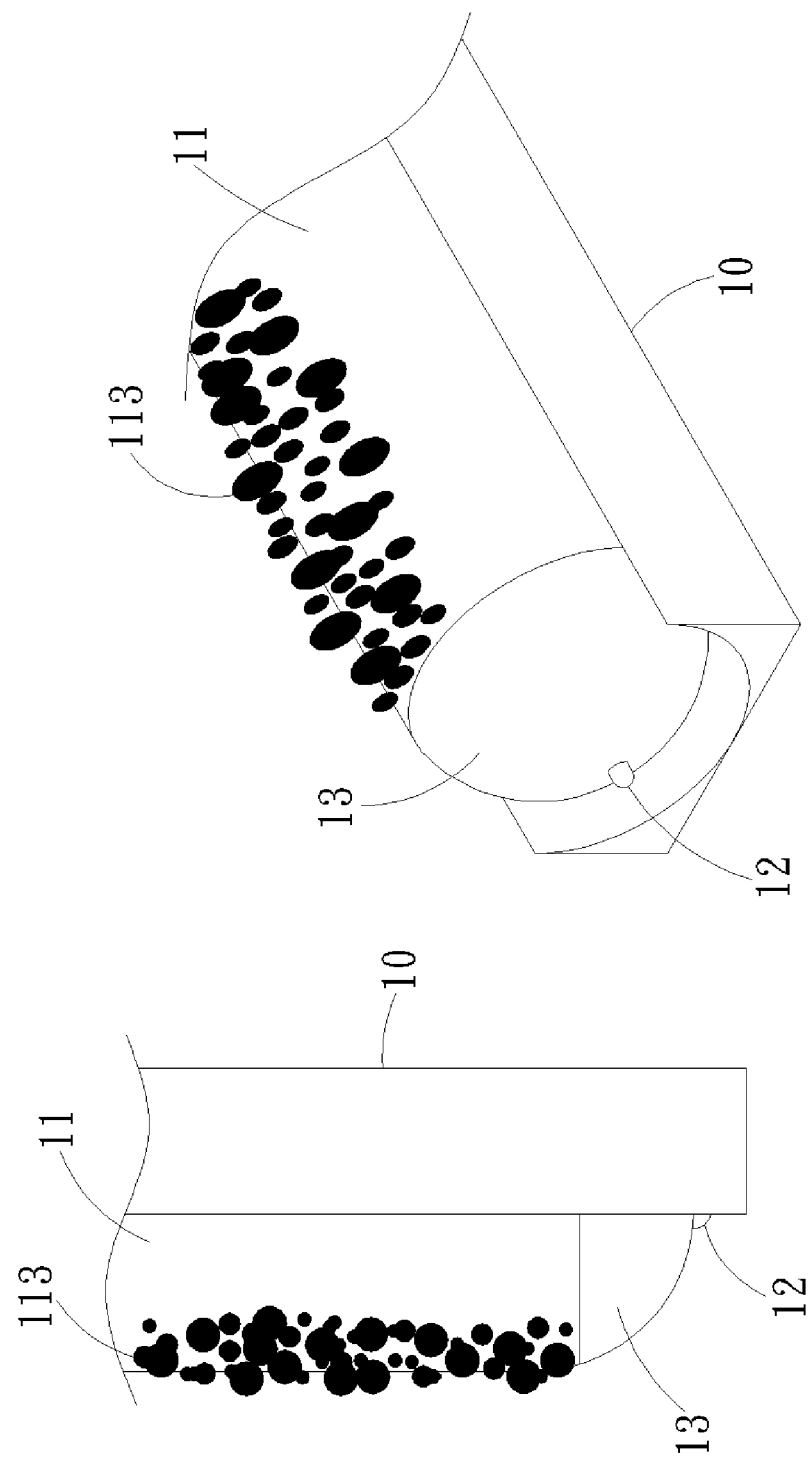
FIG. 12 is a diagram showing a plurality of particles with optical coupling according to an embodiment of the present disclosure.

Please refer to FIG. 11 together with FIG. 12. FIG. 11 is a diagram showing an optical film according to an embodiment of the present disclosure, and FIG. 12 is a diagram showing a plurality of particles with optical coupling according to an embodiment of the present disclosure. As shown, expect for directly disposing the micro-optics structure 110 on the light guide pipe 11, the backlight module 1 can use an optical film 112, a plurality of particles 113 with optical coupling, or a combination of the abovementioned two implementations to replace the micro-optics structure 110 shown in FIG. 8 and FIG. 9. The optical film 112 may have at least one micro-optics structure(s) 1120 disposed thereon, wherein the micro-optics structure(s) 1120 is similar to the micro-optics structure 110 shown in FIG. 8-FIG. 9. What calls for special attention is that: by modifying the size, the shape, and the distribution of the micro-optics structure(s) 1120 disposed on the optical film 112, the efficiency of the backlight module 1 can be further improved.

Figure 13:
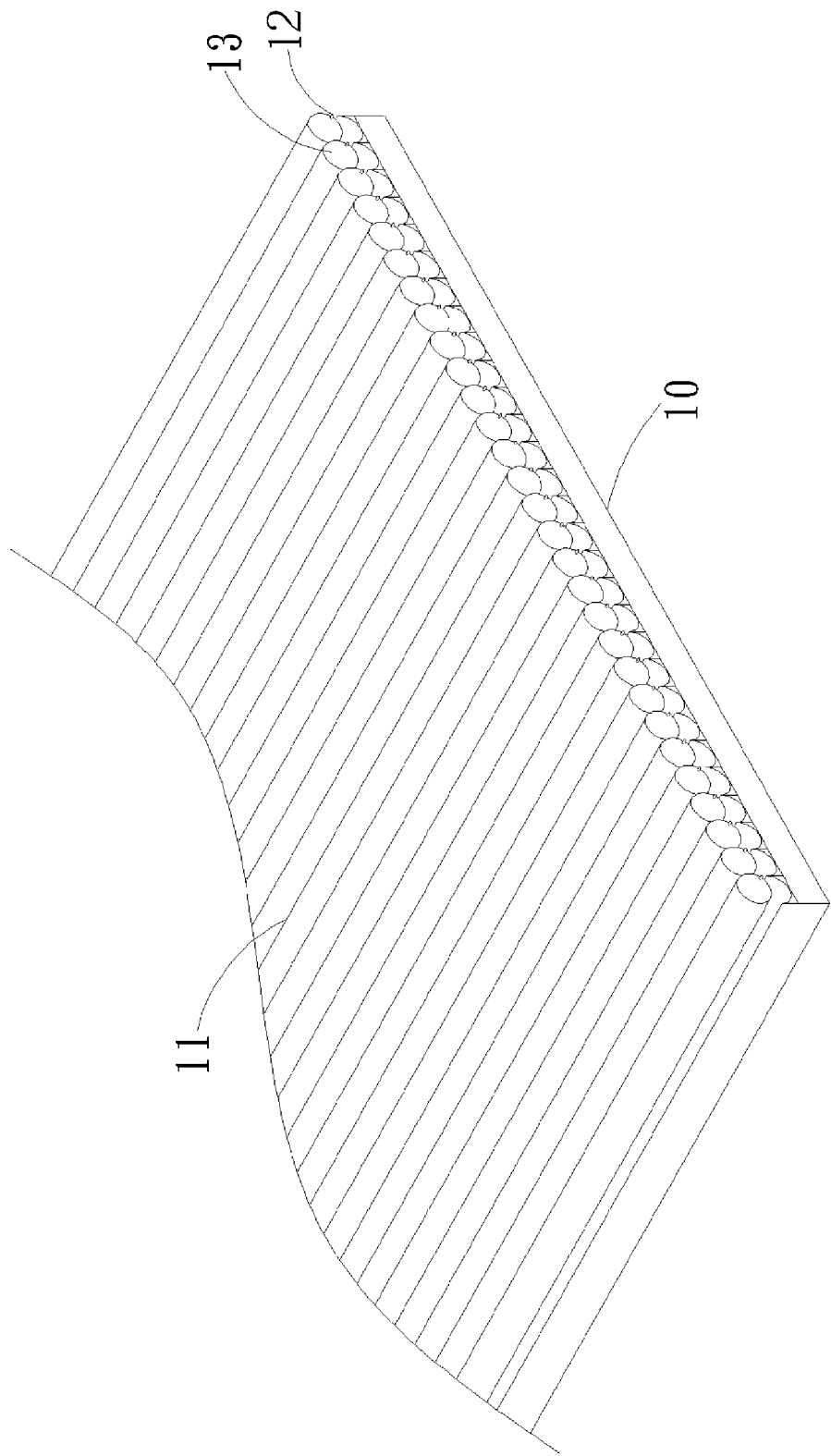
FIG. 13 is a diagram of a backlight module according to an embodiment of the present disclosure.

Please refer to FIG. 13. FIG. 13 is a diagram of a backlight module according to an embodiment of the present disclosure. As shown, the backlight module 1 in this embodiment may include an optical substrate 10, at least one light guide pipe 11, at least one first light source 12, and at least one light source reflector 13. The light guide pipe 11 is parallel to and disposed on the optical substrate 10, and is connected to the first light source 12 in order to transfer the light(s) emitted from the first light source 12 and the light(s) reflected by the first light source reflector 13. By using the abovementioned means of modifying the light guide pipe 11 as well as the modifications of the parameters of the optical substrate 10 and the film(s) disposed thereon (not shown), the backlight module disclosed in the present disclosure can be extended into arbitrary sizes depending on different backlight requirements without changing its thickness and ease of manufactures. Therefore, the design of the present disclosure can be applied to backlight devices with various sizes, especially large-scaled backlight module(s), thereby the problem that the volume of the backlight modules is too large can be avoided.

In summary, by utilizing different arrangements of the light guide pipe(s), different geometric configurations, or different micro-optics structures, the light guide pipe(s) of the backlight module can generate light-guiding effects, such that complexity and cost of manufacturing processes for manufacturing the backlight module can be reduced in order to further simplify the architecture of the optical system. Therefore, the goal of lightening a large-scale backlight module and improving its luminous efficiency can be achieved.

Those skilled in the art will readily observe that numerous modifications and alterations of the device and method may be made while retaining the teachings of the invention.

What is claimed is:

1. A backlight module, comprising:
   an optical substrate, comprising at least one accommodation trench disposed thereon;
   at least one light guide pipe, the at least one light guide pipe is columnar, wherein the at least one light guide pipe is accommodated in the at least one accommodation trench; and
   at least one first light source, disposed at a first side of the at least one light guide pipe;
   wherein the at least one first light source is arranged for emitting at least one first light into the at least one light guide pipe, and the at least one first light is transferred in the at least one light guide pipe and leaves the at least one light guide pipe when being reflected by the optical substrate; and an envelope surface of an inner wall of each of the at least one light guide pipe is not parallel to an envelope surface of an outer wall of each of the at least one light guide pipe.

2. The backlight module according to claim 1, further comprising:
   at least one first light source reflector, disposed on the first side of the at least one light guide pipe and covering the at least one first light source, and arranged for coupling the at least one first light emitted from the at least one first light source to the at least one light guide pipe.

3. The backlight module according to claim 1, further comprising:
   at least one second light source, disposed at a second side of the at least one light guide pipe, wherein the at least one second light source is arranged for emitting at least one second light into the at least one light guide pipe, and the at least one second light is transferred in the at least one light guide pipe and leaves the at least one light guide pipe when being reflected by the optical substrate.

4. The backlight module according to claim 3, further comprising:
   at least one second light source reflector, disposed on the second side of the at least one light guide pipe and covering the at least one second light source, and arranged for coupling the at least one second light emitted from the at least one second light source to the at least one light guide pipe.

5. The backlight module according to claim 1, wherein a cross section of each of the at least one light guide pipe is shaped into a circular, an ellipse, or a polygon.

6. The backlight module according to claim 5, wherein a cross section of each of the at least one accommodation trench is shaped into a circular, an ellipse, or a polygon.

7. The backlight module according to claim 6, wherein a film is disposed on a surface of each of the at least one accommodation trench, and the film comprises a material of aluminum, silver, or mercury or a material having a reflectivity greater than 80%.

8. The backlight module according to claim 1, wherein each of the at least one light guide pipe has at least one micro-optics structure disposed thereon, and each of the at least one micro-optics structure comprises a V-shaped incision, a hemispherical incision, or a pyramidal incision.

9. The backlight module according to claim 1, wherein an oblique angle is existed between the inner wall and the outer wall of each of the at least one light guide pipe.

10. The backlight module according to claim 1, wherein each of the at least one light guide pipe comprises an optical film having at least one micro-optics structure, a plurality of particles with optical coupling, or their combination disposed thereon, and each of the at least one micro-optics structure comprises a V-shaped incision, a hemispherical incision, or a pyramidal incision.

11. The backlight module according to claim 1, wherein each of the light guide pipe is made of a translucent material, and the translucent material comprises a Poly methyl meth acrylate (PMMA), a quartz, a glass, a Polyvinylchloride (PVC), or a Polycarbonate (PC).

* * * * *